(12) United States Patent
Holmes et al.

(10) Patent No.: US 9,211,786 B2
(45) Date of Patent: Dec. 15, 2015

(54) HYBRID VEHICLE WITH FLYWHEEL AND ELECTRIC KINETIC ENERGY SYSTEM

(71) Applicant: GM Global Technology Operations LLC, Detroit, MI (US)

(72) Inventors: Alan G. Holmes, Clarkston, MI (US); Shawn Scott Hawkins, Shelby Township, MI (US); Steven A. Tarnowsky, West Bloomfield, MI (US); Brendan M. Conlon, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 267 days.

(21) Appl. No.: 13/874,906

(22) Filed: May 1, 2013

(65) Prior Publication Data

US 2014/0248985 A1   Sep. 4, 2014

Related U.S. Application Data

(60) Provisional application No. 61/771,327, filed on Mar. 1, 2013.

(51) Int. Cl.
*B60K 6/10* (2006.01)
*B60K 6/42* (2007.10)
*B60K 6/44* (2007.10)
*B60K 6/52* (2007.10)

(52) U.S. Cl.
CPC . *B60K 6/42* (2013.01); *B60K 6/105* (2013.01); *B60K 6/44* (2013.01); *B60K 6/52* (2013.01); *Y02T 10/623* (2013.01); *Y02T 10/6204* (2013.01); *Y02T 10/6265* (2013.01); *Y02T 10/6282* (2013.01); *Y10S 903/902* (2013.01)

(58) Field of Classification Search
CPC ........ B60K 6/105; B60K 6/30; B60K 17/354; Y02T 10/6204; Y02T 10/6282; Y02T 10/6247
See application file for complete search history.

(56) References Cited

U.S. PATENT DOCUMENTS

| | | | | |
|---|---|---|---|---|
| 2,144,307 | A | * | 1/1939 | Hallden .......................... 475/218 |
| 4,233,858 | A | * | 11/1980 | Rowlett ................. B60K 6/105 |
| | | | | 180/65.235 |
| 4,423,794 | A | * | 1/1984 | Beck .............................. 180/165 |
| 6,371,878 | B1 | * | 4/2002 | Bowen .............................. 475/5 |
| 7,867,124 | B2 | | 1/2011 | Conlon et al. |
| 7,963,874 | B2 | | 6/2011 | Conlon |
| 8,425,358 | B2 | * | 4/2013 | Tsyganov .......................... 475/5 |
| 2008/0254936 | A1 | * | 10/2008 | Yang .................................. 477/5 |
| 2011/0094809 | A1 | * | 4/2011 | Poschmann et al. ...... 180/65.225 |
| 2012/0197472 | A1 | * | 8/2012 | He et al. .......................... 701/22 |

* cited by examiner

*Primary Examiner* — Robert Hodge
*Assistant Examiner* — Ryan Dodd
(74) *Attorney, Agent, or Firm* — Harness, Dickey & Pierce, P.L.C.

(57) ABSTRACT

A hybrid vehicle includes an engine drivingly connected to a first pair of drive wheels by a transmission. A first motor generator is coupled to the engine to provide drive torque to the transmission for driving the first pair of drive wheels. A second motor generator is drivingly connected to a flywheel by a planetary gear system. The planetary gear system is connected to a second pair of drive wheels.

14 Claims, 1 Drawing Sheet

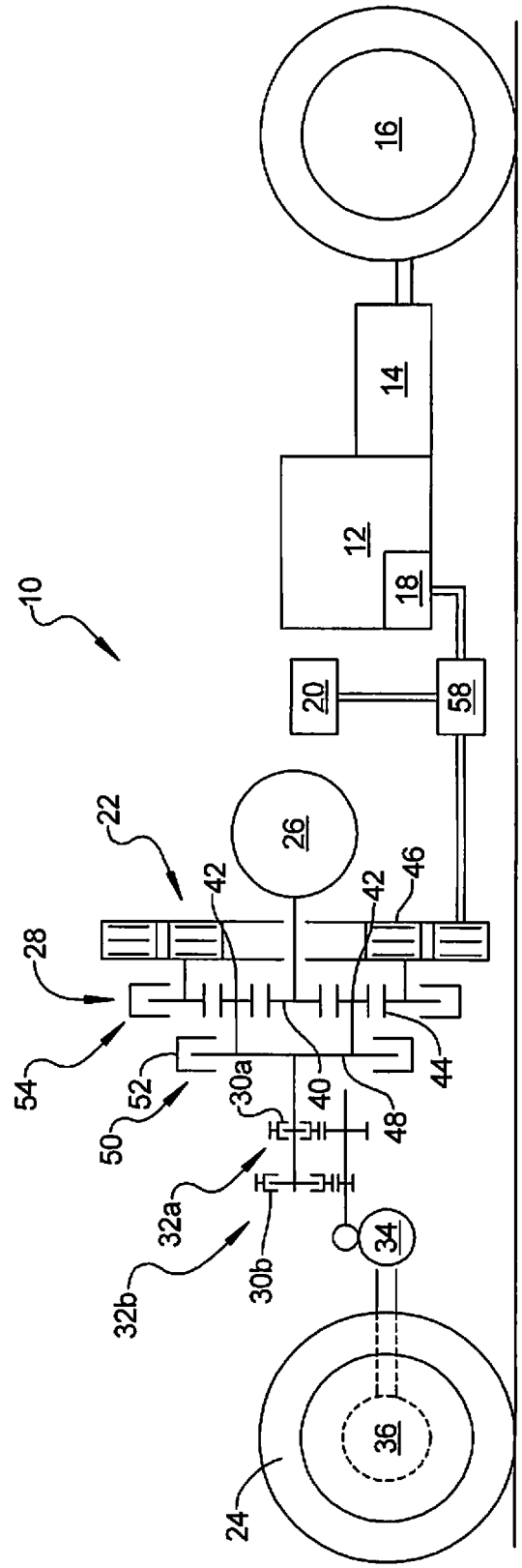

HYBRID VEHICLE WITH FLYWHEEL AND ELECTRIC KINETIC ENERGY SYSTEM

CROSS-REFERENCE TO RELATED APPLICATIONS

This application claims the benefit of U.S. Provisional application No. 61/771,327, filed on Mar. 1, 2013. The entire disclosure of the above application is incorporated herein by reference.

FIELD

The present disclosure relates to a hybrid vehicle drive system, and more particularly to a hybrid vehicle drive system with flywheel and electric kinetic energy system.

BACKGROUND

This section provides background information related to the present disclosure which is not necessarily prior art.

Hybrid vehicles operate using stored electric energy for powering an electric motor and an internal combustion engine. Some hybrid vehicles have employed regenerative braking to capture braking energy that is converted into electricity and stored in a battery to improve the vehicle efficiency. Other measures to improve hybrid vehicle efficiency and performance are still desired.

SUMMARY

This section provides a general summary of the disclosure, and is not a comprehensive disclosure of its full scope or all of its features.

A hybrid vehicle includes an engine drivingly connected to a first pair of drive wheels by a transmission. A first motor generator is coupled to the engine to provide drive torque to the transmission for driving the first pair of drive wheels. A second motor generator is drivingly connected to a flywheel by a planetary gear system. The planetary gear system is connected to a second pair of drive wheels.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The FIGURE is a schematic diagram of a hybrid vehicle powertrain having a flywheel and electric kinetic energy system according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the FIGURES. Spatially relative terms may be intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the FIGURE, a hybrid vehicle 10 is provided with an engine 12 that supplies drive torque through a transmission 14 to a pair of rear wheels 16. A motor generator 18 is coupled to the engine 12 to also provide drive torque through the transmission to the rear wheels 16 and can also be driven by the engine 12 to generate electricity. The electricity can be supplied to a battery 20 or to a motor generator 22 that can be connected to the front wheels 24 and a flywheel 26 via a planetary gear system 28. The flywheel 26 can also be coupled to the front wheels 24 through the planetary gear set 28 by clutches 30a, 30b, a gear pair 32a, 32b, a final drive gear pair 34, and an axle differential 36.

The planetary gear system 28 may take on various forms, and in the embodiment shown includes a sun gear 40 coupled to the flywheel 26. A plurality of planetary gears 42 are meshingly engaged with the sun gear 40 and with a ring gear 44. The ring gear 44 can be coupled to the rotor 46 of the motor generator 22. A planetary carrier 48 supports the plurality of planetary gears 42 and is drivingly connected to the front wheels 24 via the clutch 30. A carrier brake 50 can be provided for fixedly engaging the planet carrier 48 to a housing 52 of the planetary gear system 28. A ring brake 54 can also be provided for fixing the ring gear 44 to the housing 52 of the planetary gear system 28.

An inverter 58 is provided in connection with the motor generator 18 and motor generator 22 and can supply electricity to the battery 20 for charging the battery 20 or can deliver electricity from the battery 20 to each of the motor generators 18, 22. The motor generator 18 can be connected to the crankshaft of the engine 12 via direct connection or via a belt and pulley drive or chain and sprocket drive system. Although the present disclosure has provided the engine 12 as driving the rear wheels 16 and the motor generator 22 and flywheel 26 are in driving engagement with the front wheels 24, it should be understood that the system may be reversed so that the engine 12 and electric motor 18 can drive the front wheels 24 and the motor generator 22 and flywheel 26 can be selectively coupled for driving the rear wheels 16.

When the vehicle is turned on, the flywheel 26 may be at rest. If so, and it is desired that the flywheel 26 be immediately made ready to assist in launching the vehicle 10, then the brake 50 on the planet carrier 48 is closed and the motor generator 22 provides torque to turn the ring gear 44 and thereby to accelerate the flywheel 26 from rest to an operating speed. The electric power for the motor generator 22 may come from the motor generator 18, which is coupled to the engine 12, from a battery 20, or from both the motor generator 18 and the battery 20. The clutches 30a, 30b to the gear pairs 32a, 32b may remain open during the charging of the flywheel 26. When the flywheel 26 has been sufficiently charged, the brake 50 on the carrier 48 may be opened and the motor generator 22 may continue to rotate to provide torque to offset the drag of the planetary gear set 28 on the flywheel 26 and therefore keep the flywheel 26 in a charged state.

When the vehicle 10 is shifted into gear to prepare to be launched from rest, the clutch 30a to the gear pair 32a is closed, to couple the carrier 48 of the planetary gear set 28 to the wheels 24, and the ring gear 44 spins. As the vehicle 10 is commanded to be launched from rest, torque is applied to the ring gear 44 by the electric-motor generator 22, acting as a generator, by the brake 54 on the ring gear 44, or by a combination of the motor/generator 22 and the brake 54. This causes the flywheel 26 to apply torque to the planetary carrier 48, torque which is transmitted to the wheels 24 by the clutch 30a, gear pair 32a, final drive gear pair 34 and axle differential 36. Electric power generated by the motor generator 22 may be transmitted to the motor generator 18 and used to assist the engine in driving the rear wheels 16, or can be supplied to the battery 20 to recharge the battery 20.

As the wheel speed increases, the speed of the motor generator 22, which is also the slip speed of the brake 54 on the ring gear 44, decreases. As the slip speed of the brake 54 nears zero, another clutch 30b from the carrier 48 to another gear pair 32b can be applied and the clutch 30a from the gear pair 30a that was used for launch may be released. That is, the transmission from the flywheel 26, first motor generator 22, and planetary gear set 28 to the front wheels 24 may be shifted from one ratio to another, which raises the speed of the motor generator 22 and the slip speed of the brake 54 on the ring gear 44. Meanwhile, the flywheel speed is being forced downward, and power is being transmitted from the flywheel 26 to the front wheels 24 and through the motor generator 18 to the rear wheels 16. If the brake 54 on the ring gear 44 is open, and the motor generator 22 is operated as a motor, turning the ring gear 44 in the same direction as the flywheel 26, the power is transmitted from the flywheel 26 to the front wheels 24 and from the motor generator 18 and thus from the engine 12 to the rear wheels 16.

This process can essentially be reversed to recover energy from the wheels 24 into the flywheel 26 for braking. Energy can be recovered from the front and rear wheels 24, 16 by selecting the ratios from the wheels 24, 16 to the carrier 48 appropriately and operating the first motor/generator 22 as a motor.

The flywheel kinetic energy storage system of the present disclosure can be used for a standing start by pre-spinning the flywheel 26 with the motor generator 22. A continuously variable transmission action of the motor generators 18, 22 also conserves flywheel power which would otherwise be dissipated by a slipping clutch or slipping brake. Some energy can be recovered from both front and rear wheels 24, 16 into the flywheel 26.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid vehicle, comprising:
   an engine drivingly connected to a first pair of drive wheels by a transmission;
   a first motor generator coupled to the engine to provide drive torque to the transmission for driving the first pair of drive wheels;
   a second motor generator drivingly connected to a flywheel by a planetary gear system, said planetary gear system connected to a second pair of drive wheels, wherein said planetary gear system includes a plurality of components, said second motor generator being connected to a first of said plurality of components, said flywheel connected to a second of said plurality of components and said second pair of drive wheels connected to a third of said plurality of components, wherein said planetary gear system includes a first brake directly connected to said first of said plurality of components.

2. The hybrid vehicle according to claim 1, wherein said first of said plurality of components is a ring gear.

3. The hybrid vehicle according to claim 1, wherein said second of said plurality of components is a sun gear.

4. The hybrid vehicle according to claim 1, wherein said third of said plurality of components is a planetary carrier.

5. The hybrid vehicle according to claim 1, wherein said planetary gear system is connected to said second pair of drive wheels by at least one gear pair.

6. A hybrid vehicle, comprising:
an engine drivingly connected to a first pair of drive wheels by a transmission;
a first motor generator coupled to the engine to provide drive torque to the transmission for driving the first pair of drive wheels;
a second motor generator drivingly connected to a flywheel by a planetary gear system, said planetary gear system connected to a second pair of drive wheels, wherein said planetary gear system includes a plurality of components, said second motor generator being connected to a first of said plurality of components, said flywheel connected to a second of said plurality of components and said second pair of drive wheels connected to a third of said plurality of components, wherein said planetary gear system includes a first brake connected to said first of said plurality of components, wherein said planetary gear system includes a second brake connected to said third of said plurality of components.

7. The hybrid vehicle according to claim 1, wherein said planetary gear system is connected to said second pair of drive wheels by a plurality of gear pairs each having a clutch for providing a selective engagement for driving said second pair of drive wheels.

8. A hybrid vehicle, comprising:
an engine drivingly connected to a first pair of drive wheels by a transmission;
a first motor generator coupled to the engine to provide drive torque to the transmission for driving the first pair of drive wheels;
a second motor generator drivingly connected to a flywheel by a planetary gear system, said planetary gear system connected to a second pair of drive wheels, wherein said planetary gear system includes a plurality of components including a ring gear, a sun gear and a planetary carrier, said second motor generator being connected to a first of said plurality of components, said flywheel connected to a second of said plurality of components and said second pair of drive wheels connected to a third of said plurality of components, wherein said planetary gear system includes a first brake directly connected to said first of said plurality of components.

9. The hybrid vehicle according to claim 8, wherein said first of said plurality of components is the ring gear.

10. The hybrid vehicle according to claim 8, wherein said second of said plurality of components is the sun gear.

11. The hybrid vehicle according to claim 8, wherein said third of said plurality of components is the planetary carrier.

12. The hybrid vehicle according to claim 8, wherein said planetary gear system is connected to said second pair of drive wheels by at least one gear pair.

13. A hybrid vehicle, comprising:
an engine drivingly connected to a first pair of drive wheels by a transmission;
a first motor generator coupled to the engine to provide drive torque to the transmission for driving the first pair of drive wheels;
a second motor generator drivingly connected to a flywheel by a planetary gear system, said planetary gear system connected to a second pair of drive wheels, wherein said planetary gear system includes a plurality of components including a ring gear, a sun gear and a planetary carrier, said second motor generator being connected to a first of said plurality of components, said flywheel connected to a second of said plurality of components and said second pair of drive wheels connected to a third of said plurality of components, wherein said planetary gear system includes a first brake connected to said first of said plurality of components, wherein said planetary gear system includes a second brake connected to said third of said plurality of components.

14. The hybrid vehicle according to claim 8, wherein said planetary gear system is connected to said second pair of drive wheels by a plurality of gear pairs each having a clutch for providing a selective engagement for driving said second pair of drive wheels.

* * * * *